United States Patent
Park et al.

(10) Patent No.: US 10,682,766 B2
(45) Date of Patent: Jun. 16, 2020

(54) DUST CLEANING CLIMBING ROBOT

(71) Applicant: DMBH Co., Ltd., Bucheon-si, Gyeonggi-do (KR)

(72) Inventors: Yong Gil Park, Seongnam-si (KR); Seung Kuk Kim, Bucheon-si (KR)

(73) Assignee: DMBH Co., Ltd., Bucheon-si, Gyeonggi-do (KR)

( * ) Notice: Subject to any disclaimer, the term of this patent is extended or adjusted under 35 U.S.C. 154(b) by 159 days.

(21) Appl. No.: 15/871,112

(22) Filed: Jan. 15, 2018

(65) Prior Publication Data

US 2019/0193274 A1    Jun. 27, 2019

(30) Foreign Application Priority Data

Dec. 21, 2017   (KR) .................. 10-2017-0177394

(51) Int. Cl.
| | |
|---|---|
| A47L 9/28 | (2006.01) |
| B25J 11/00 | (2006.01) |
| B25J 5/00 | (2006.01) |
| B25J 9/00 | (2006.01) |
| B25J 9/14 | (2006.01) |
| B08B 1/00 | (2006.01) |
| B08B 1/04 | (2006.01) |
| B25J 9/16 | (2006.01) |
| B08B 5/02 | (2006.01) |

(52) U.S. Cl.
CPC ........... B25J 11/0085 (2013.01); B08B 1/002 (2013.01); B08B 1/04 (2013.01); B08B 5/02 (2013.01); B25J 5/005 (2013.01); B25J 9/162 (2013.01); *Y10S 901/01* (2013.01)

(58) Field of Classification Search
CPC ........ B08B 1/002; B08B 1/04; B25J 11/0085; B25J 5/005; B25J 9/162; Y10S 901/01; Y10S 901/31; B62D 55/075
USPC .................................... 15/246; 901/1, 28, 41
See application file for complete search history.

(56) References Cited

U.S. PATENT DOCUMENTS

| | | | | |
|---|---|---|---|---|
| 6,113,343 | A * | 9/2000 | Goldenberg | B25J 5/005 239/587.2 |
| 7,707,907 | B2 * | 5/2010 | Bonev | B25J 9/106 74/490.03 |
| 7,877,835 | B2 * | 2/2011 | Okada | B08B 1/008 15/102 |
| 9,130,502 | B1 * | 9/2015 | Aly | B08B 11/04 |
| 2012/0138105 | A1 * | 6/2012 | Masia Perales | B08B 1/002 134/99.2 |

(Continued)

FOREIGN PATENT DOCUMENTS

| | | | | |
|---|---|---|---|---|
| CN | 106424014 A | * | 2/2017 | ............... B08B 1/04 |
| CN | 108555876 A | * | 9/2018 | ............... B08B 1/04 |

(Continued)

*Primary Examiner* — Joseph J Hail
*Assistant Examiner* — Arman Milanian
(74) *Attorney, Agent, or Firm* — Revolution IP, PLLC

(57) ABSTRACT

A dust cleaning robot includes: a climbing cleaning robot unit for climbing side surfaces of a dust collection plate to remove dust accumulated on the dust collection plate; and a transfer robot unit operating with the climbing cleaning robot unit mounted thereon to transfer the climbing cleaning robot unit to the side surfaces of the dust collection plate so that the climbing cleaning robot unit is fixed to outer walls of the dust collection plate.

6 Claims, 10 Drawing Sheets

(56) References Cited

U.S. PATENT DOCUMENTS

| | | | | |
|---|---|---|---|---|
| 2013/0206173 A1* | 8/2013 | Zijlstra | ................... | B08B 1/008 |
| | | | | 134/6 |
| 2014/0298601 A1* | 10/2014 | Winkler | ................... | E04H 4/16 |
| | | | | 15/1.7 |
| 2015/0135459 A1* | 5/2015 | Lee | ........................... | B08B 7/04 |
| | | | | 15/246 |
| 2015/0349706 A1* | 12/2015 | Grossman | ............... | H02S 40/10 |
| | | | | 134/6 |
| 2017/0063293 A1* | 3/2017 | Parrott | .................... | H02S 40/10 |
| 2017/0291242 A1* | 10/2017 | Benzing | ................. | B23K 9/206 |
| 2019/0056744 A1* | 2/2019 | Li | ........................ | G05D 1/0287 |

FOREIGN PATENT DOCUMENTS

| | | | | | |
|---|---|---|---|---|---|
| JP | H0975781 | A | * | 3/1997 | ............... B08B 1/04 |
| JP | H10202563 | A | * | 8/1998 | ............... B08B 1/04 |
| KR | 20030045205 | A | * | 6/2003 | ............... B08B 1/04 |
| KR | 20110077185 | A | * | 7/2011 | ............... B08B 1/04 |
| KR | 20140085837 | A | * | 7/2014 | ............... B03C 3/74 |

* cited by examiner

DUST CLEANING CLIMBING ROBOT

CROSS REFERENCE TO RELATED APPLICATION

The present application claims the benefit of Korean Patent Application No. 10-2017-0177394 filed in the Korean Intellectual Property Office on Dec. 21, 2017, the entire contents of which are incorporated herein by reference.

BACKGROUND

The present invention relates to a dust cleaning robot, and more particularly, to a dust cleaning robot that is used to clean dust or foreign matters accumulated on dust collection plates spaced apart from each other by a given distance on an opposite side thereto.

Generally, a plant from which harmful air is emitted is provided with a dust collection device that purifies harmful ingredients like dust, foreign matters, and so on contained in the air and thus emits the purified air.

The dust collection device is configured to allow electricity to be applied to dust collection plates made of steel plates so that static electricity is generated from the dust collection plates to collect the dust or foreign matters on the dust collection plates.

After a given period of time passes, air purification becomes deteriorated due to the dust or foreign matters accumulated on the dust collection plates, and accordingly, the dust or foreign matters on the dust collection plates should be removed directly by a worker.

However, a space between the dust collection plates is small and long, and accordingly, it is very hard that the worker enters the space to clean the dust collection plates. Further, the dust or foreign matters are removed by hitting the dust collection plates, thereby undesirably causing low cleaning efficiencies.

SUMMARY

Accordingly, the present invention has been made in view of the above-mentioned problems occurring in the prior art, and it is an object of the present invention to provide a dust cleaning robot that is provided with a climbing cleaning robot unit for climbing side surfaces of a dust collection plate to clean the dust collection plate and a transfer robot unit moving with the climbing cleaning robot unit mounted thereon.

To accomplish the above-mentioned object, according to the present invention, there is provided a dust cleaning robot for cleaning dust collection plates spaced apart from each other by a given distance on an opposite side thereto, the dust cleaning robot including: a climbing cleaning robot unit for climbing side surfaces of each dust collection plate to remove dust accumulated on the dust collection plate; and a transfer robot unit operating with the climbing cleaning robot unit mounted thereon to transfer the climbing cleaning robot unit to the side surfaces of the dust collection plate so that the climbing cleaning robot unit is fixed to outer walls of the dust collection plate.

According to the present invention, desirably, the transfer robot unit includes: a robot body having a driving part for moving the transfer robot unit to a direction of X-axis as a forward and backward direction; a first stage part located on top of the robot body in such a manner as to move in the direction of X-axis; a second stage part located on top of the first stage part in such a manner as to move in a direction of Y-axis as a left and right direction; and support means located between the first stage part and the second stage part in such a manner as to come into contact with one side surface of the dust collection plate to support the transfer robot unit when the second stage part moves to one side of the direction of Y-axis.

According to the present invention, desirably, the first stage part includes: a first guide having first and second rails disposed in the direction of X-axis on a top plate of the robot body and a pair of guide blocks coupled correspondingly to the first and second rails; a first driver having a shaft parallel-disposed between the first and second rails and a screw formed along the outer peripheral surface thereof, a moving block engaged with the shaft in such a manner as to move by the rotation of the shaft, and a driving device for rotating the shaft; and a first stage having first and second long plates coupled to tops of the guide blocks, a first cross plate located in the direction of Y-axis to allow the other side top of each of the first and second long plates in the direction of X-axis to be coupled to the moving block, and a second cross plate located on one side of the direction of X-axis of each of the first and second long plates in such a manner as to be located symmetrically to the first cross plate.

According to the present invention, desirably, the support means includes: a hydraulic piston parallel-disposed between the first and second cross plates in such a manner as to be extended to one side of the direction of Y-axis; and a support part disposed on the hydraulic piston in such a manner as to come into contact with the side surfaces of the dust collection plate.

According to the present invention, desirably, the second stage part includes: a second stage having rails attached to the underside thereof in such a manner as to move along guide rails coupled to tops of the first and second cross plates in the direction of Y-axis; a rack shaft coupled to one side of the direction of X-axis of the second stage in the direction of Y-axis and having a screw thread formed therearound; a second driver rotated engagedly with the screw thread of the rack shaft in such a manner as to move the second stage to one side of the direction of Y-axis; and a seating plate coupled to top of the second stage to seat the climbing cleaning robot unit thereonto.

According to the present invention, desirably, the climbing cleaning robot unit includes: a coupling plate seated onto the seating plate; a robot body located on top of the coupling plate; a brush part located on an upper portion of the robot body; a fixing part for fixing the climbing cleaning robot unit to the dust collection plate; and an elevating part for elevating the climbing cleaning robot unit in the state where the climbing cleaning robot unit is fixed to the dust collection plate by means of the fixing part.

According to the present invention, desirably, the seating plate has a plurality of seating blocks protruding from top thereof to a shape of a cylinder having an inclined outer peripheral surface, and the coupling plate has coupling through holes formed thereon to insert the seating blocks thereinto, so that as a gap is formed by the seating blocks, the climbing cleaning robot unit is seated on the seating plate by means of the movements of the seating blocks even if the coupling through holes and the seating blocks are misaligned with each other at the time when the climbing cleaning robot unit is seated onto the seating plate.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
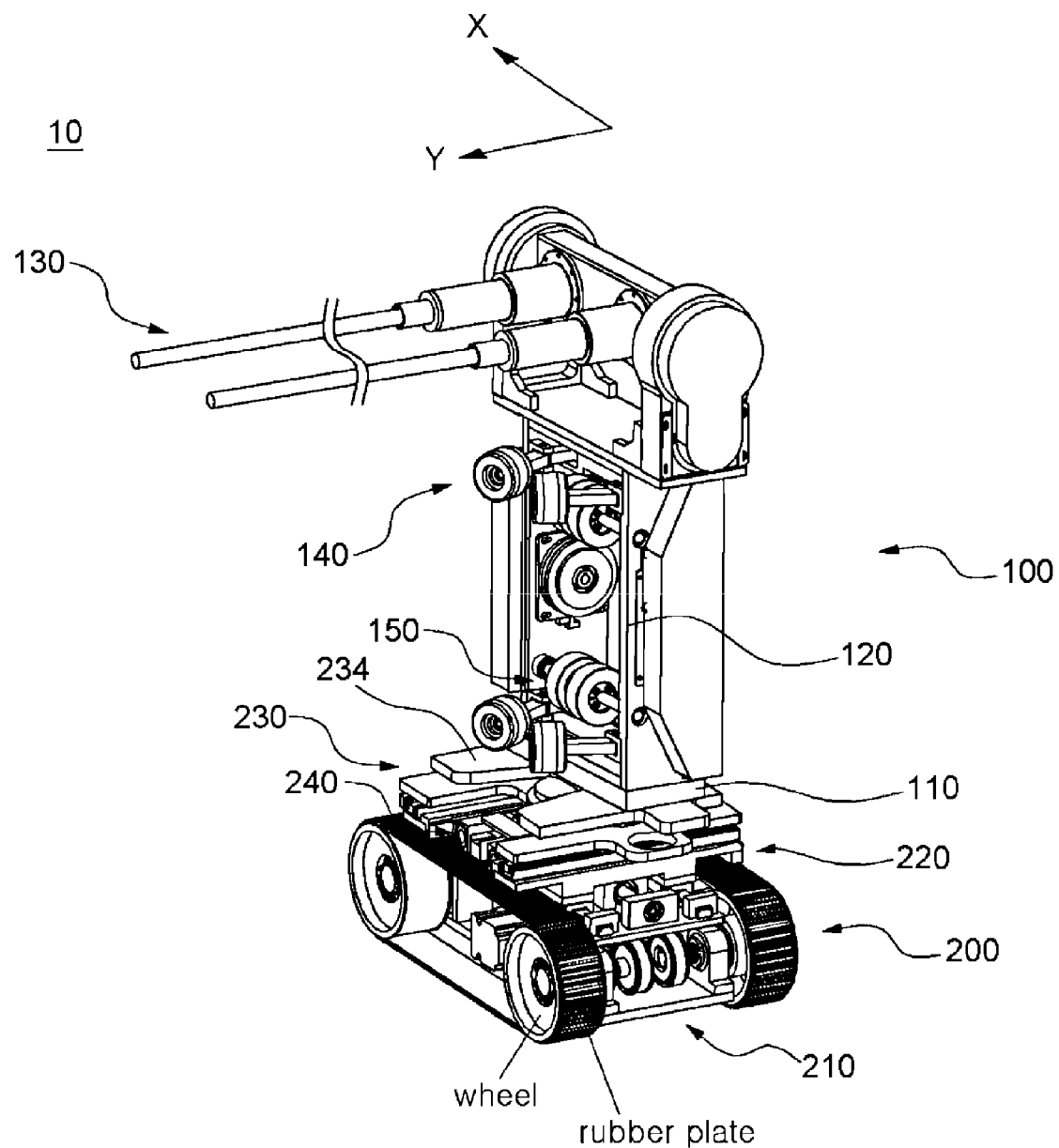
FIG. 1 is a perspective view showing a dust cleaning robot according to the present invention.

Now, an explanation on a dust cleaning robot according to the present invention will be given with reference to the attached drawings. In the description, the thicknesses of the lines or the sizes of the components shown in the drawing may be magnified for the clarity and convenience of the description.

Further, the terms as will be discussed later are defined in accordance with the functions of the present invention, but may be varied under the intention or regulation of a user or operator. Therefore, they should be defined on the basis of the whole scope of the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Figure 2:
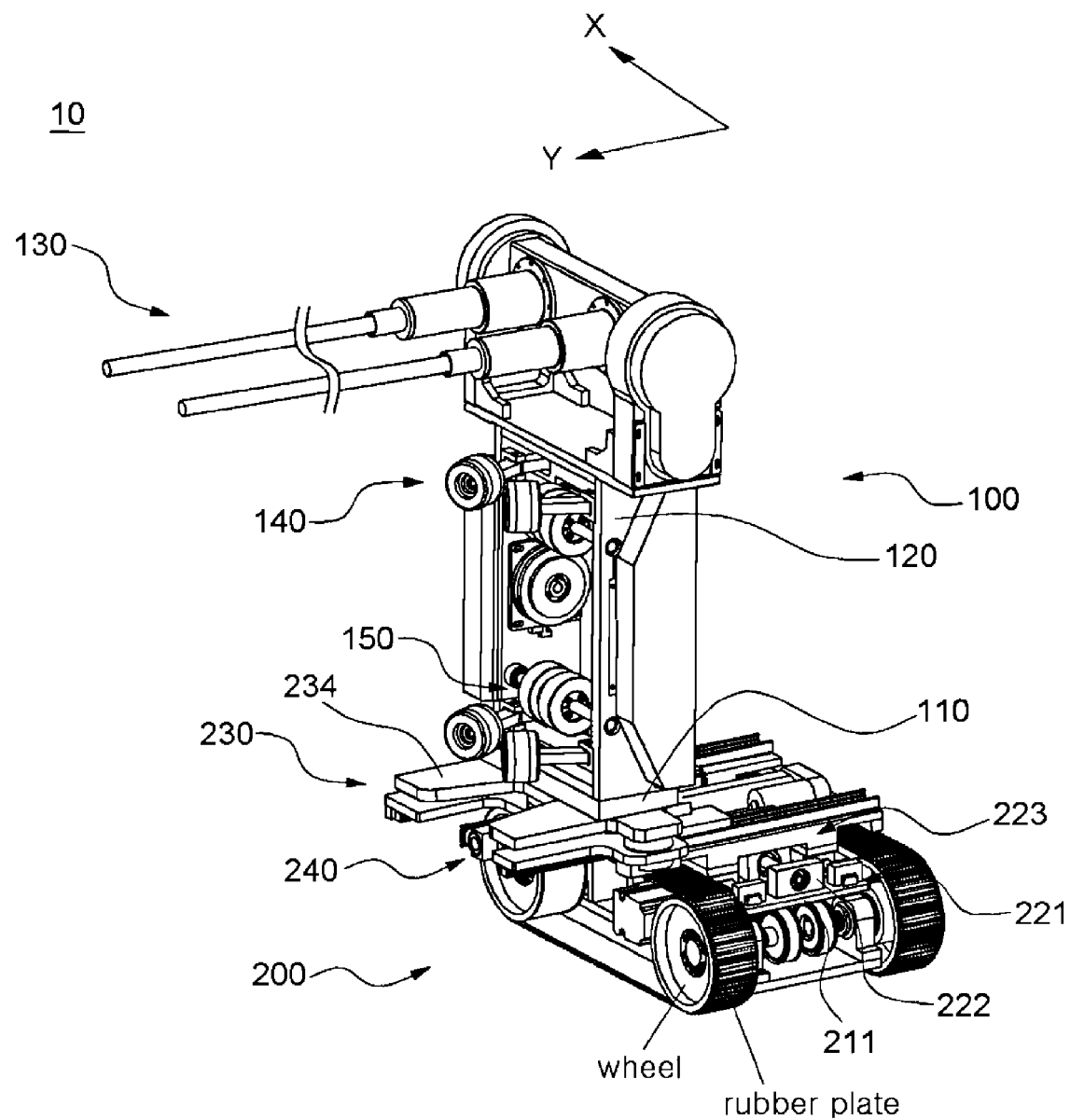
FIG. 2 is a perspective view showing an operating state of a second stage part of the dust cleaning robot according to the present invention.
Figure 3:
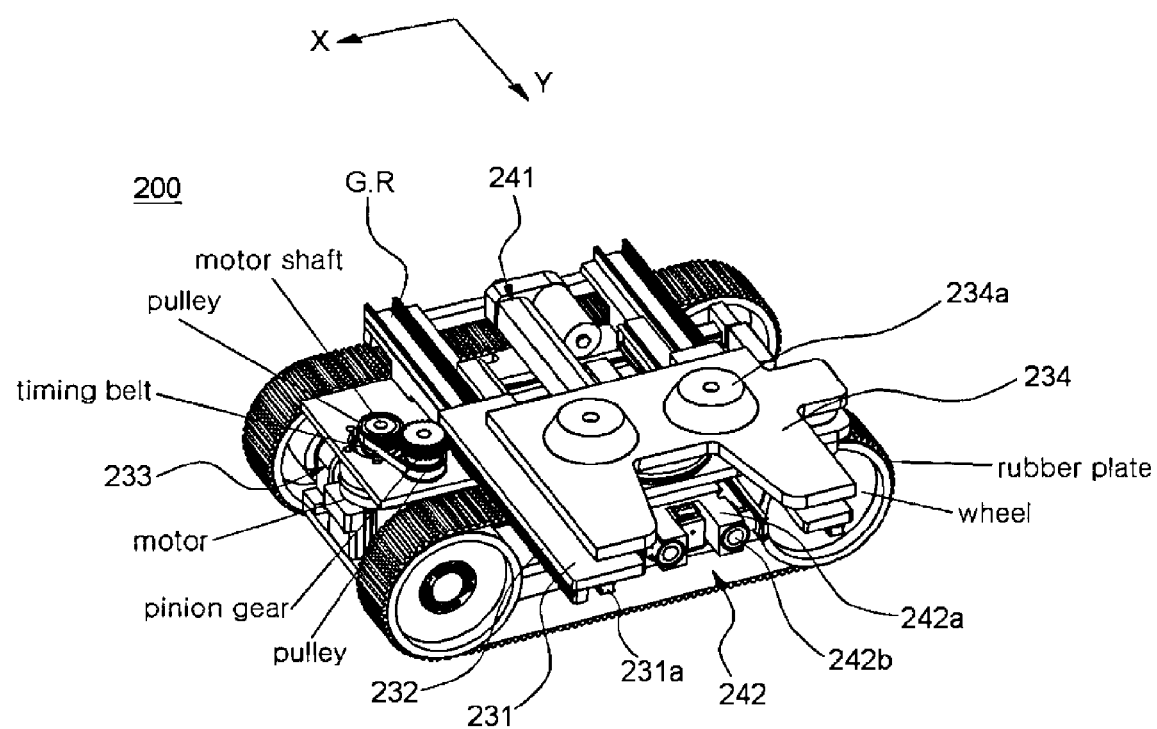
FIG. 3 is a perspective view showing an operating state of the second stage part of a transfer robot unit of the dust cleaning robot according to the present invention.
Figure 4:
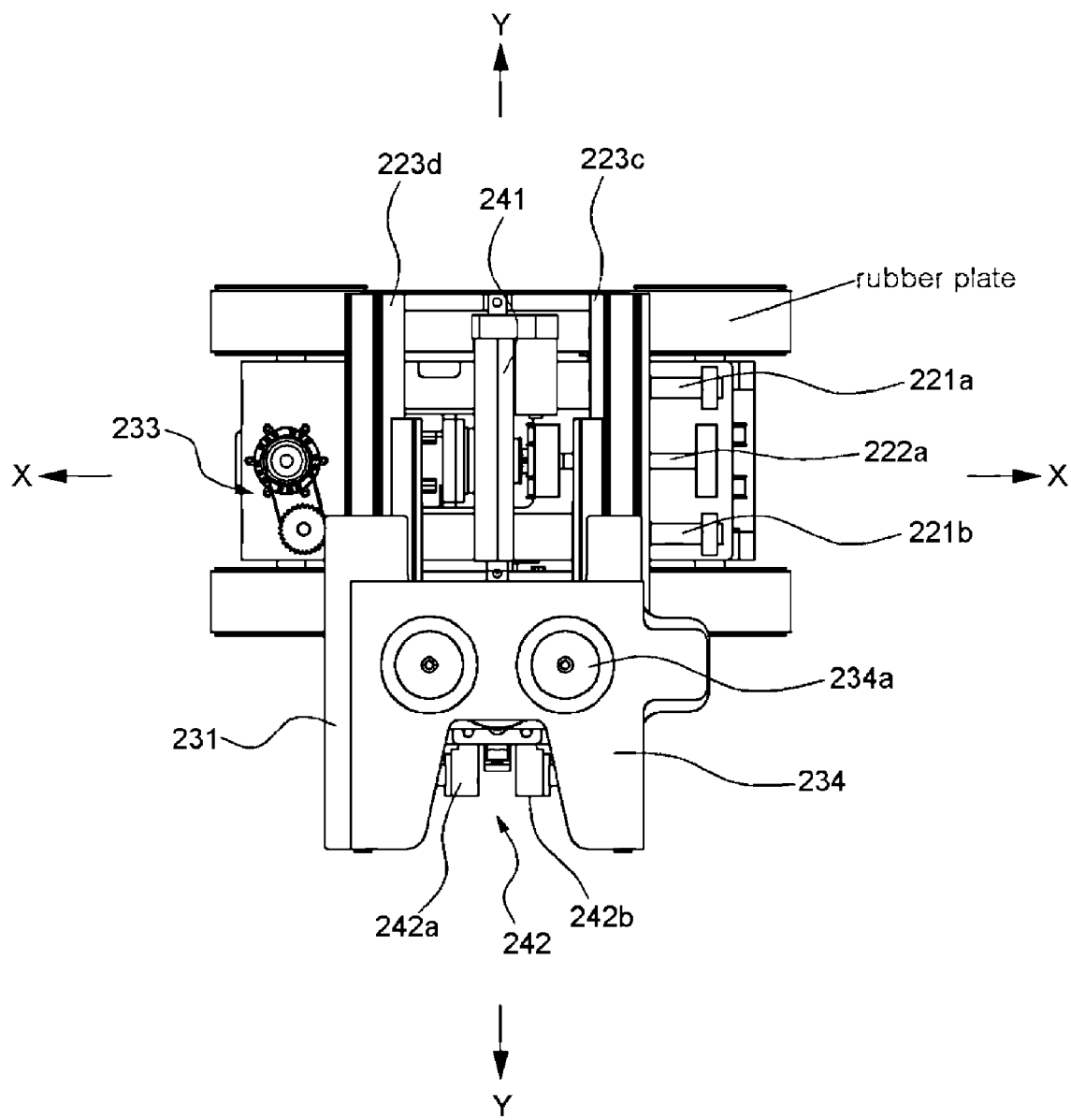
FIG. 4 is a plan view showing an operating state of the second stage part of the transfer robot unit of the dust cleaning robot according to the present invention.
Figure 5:
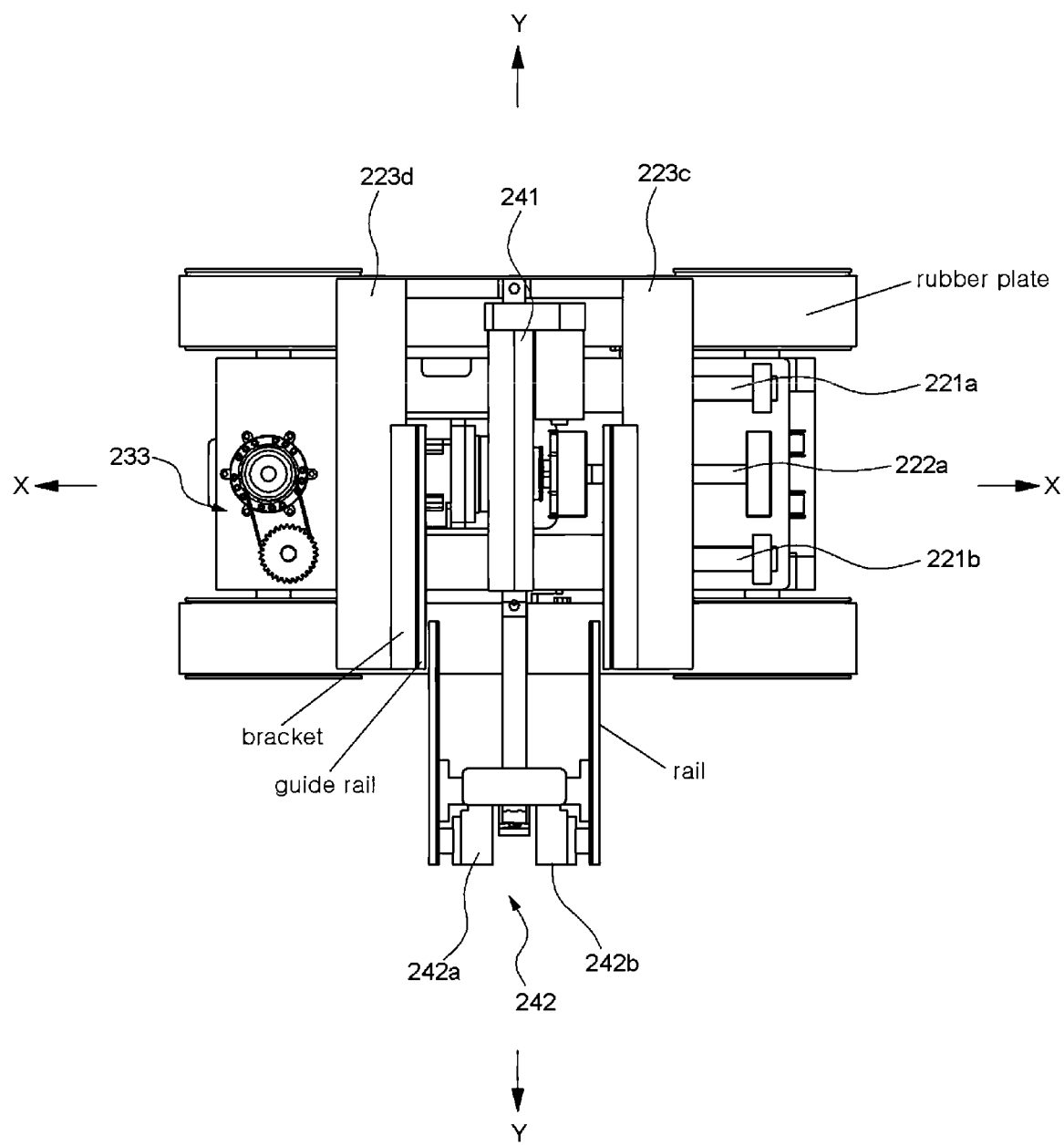
FIG. 5 is a plan view showing an operating state of support means of the transfer robot unit of the dust cleaning robot according to the present invention.
Figure 6:
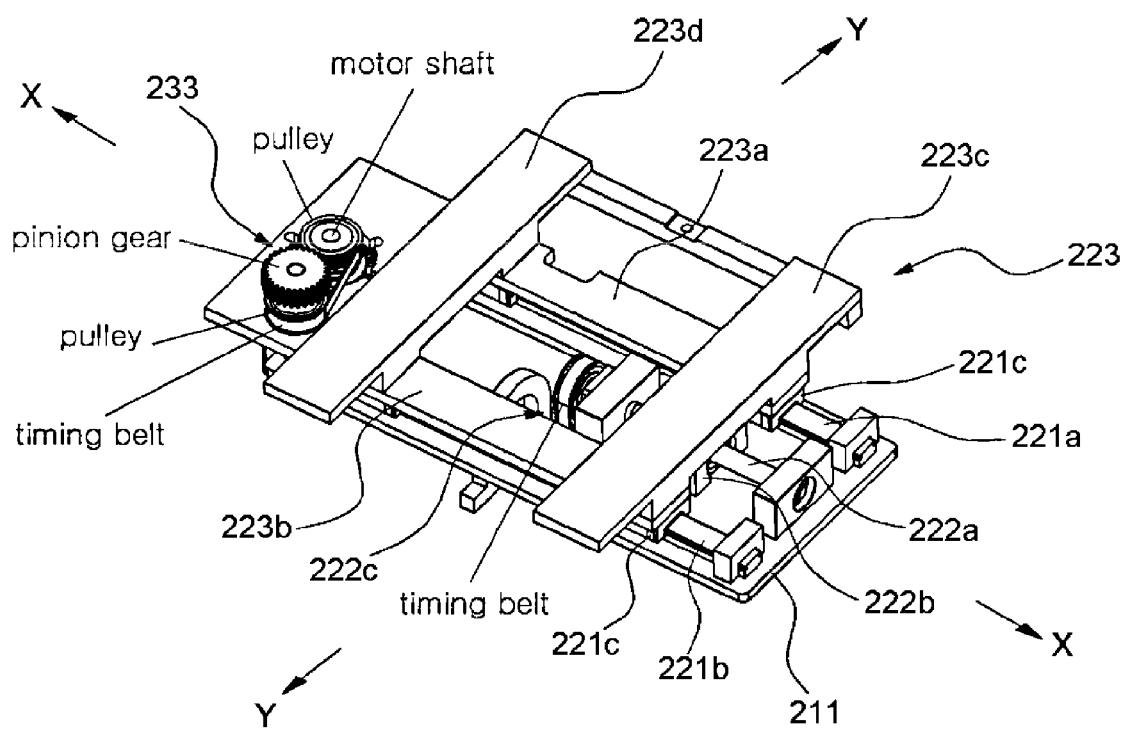
FIG. 6 is a perspective view showing a first stage part of the transfer robot unit of the dust cleaning robot according to the present invention.
Figure 7:
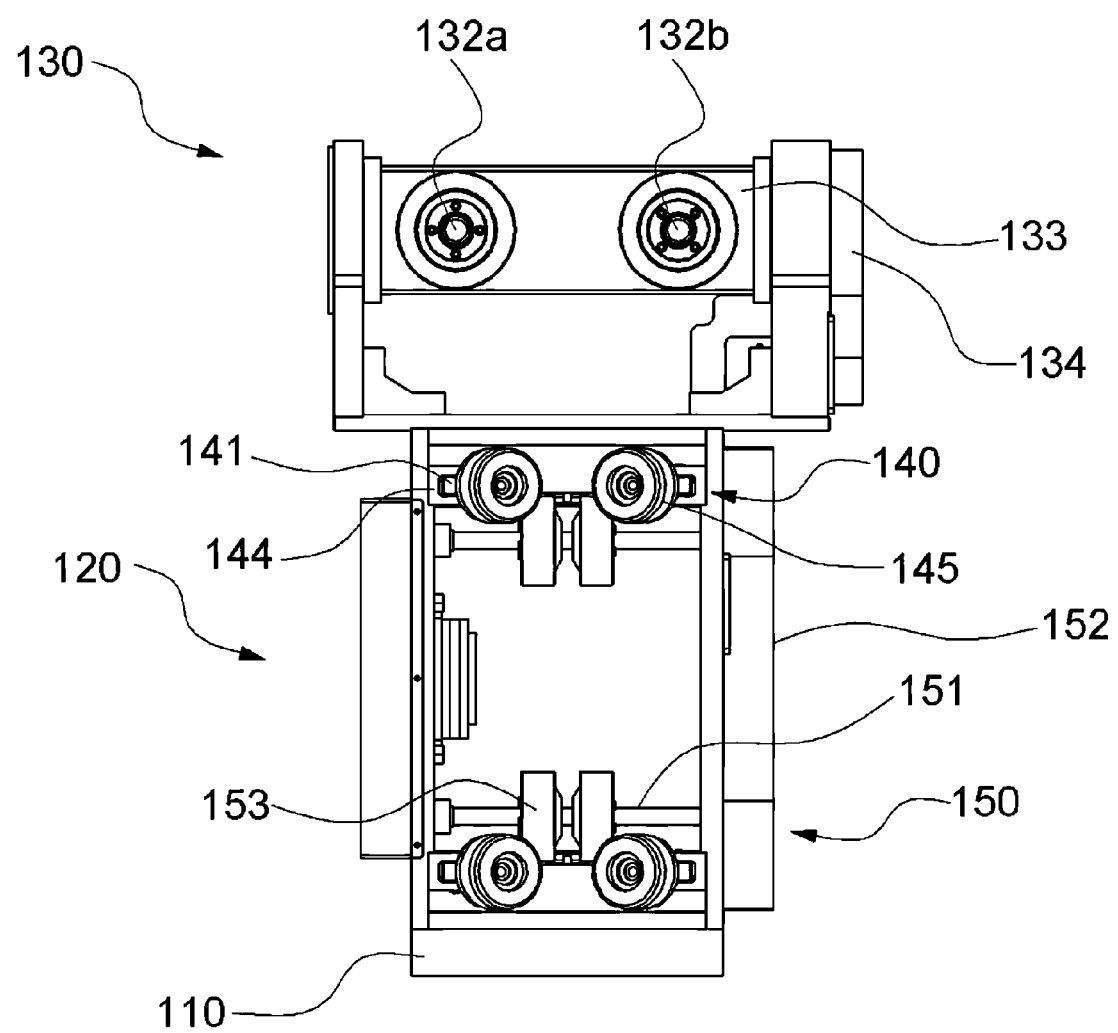
FIG. 7 is a front view showing a climbing cleaning robot unit of the dust cleaning robot according to the present invention.
Figure 8:
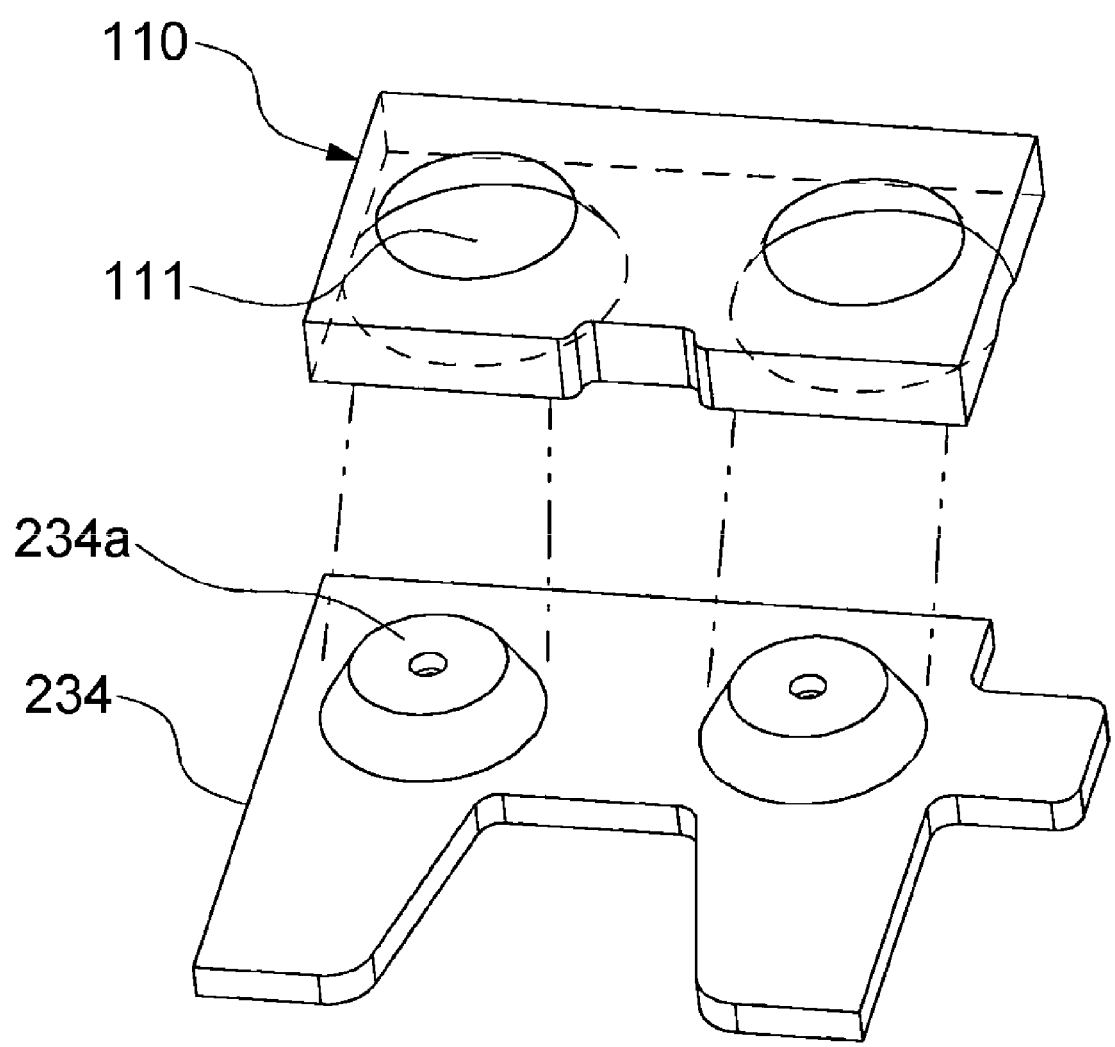
FIG. 8 is a perspective view showing the coupled state between a coupling plate and a seating plate of the dust cleaning robot according to the present invention.
Figure 9:
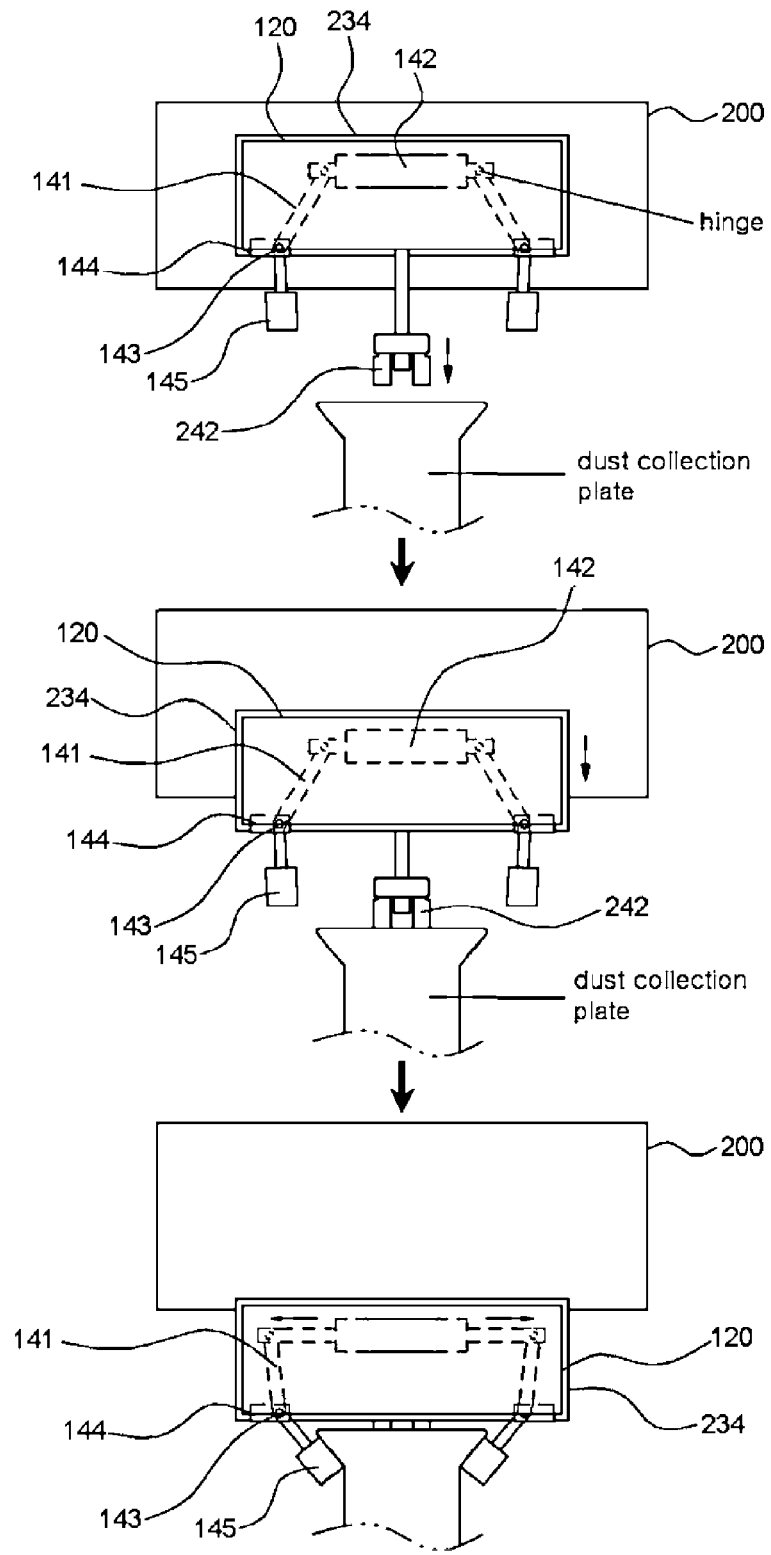
FIG. 9 is a top view showing processes for fixing the dust cleaning robot according to the present invention to a dust collection plate.
Figure 10:
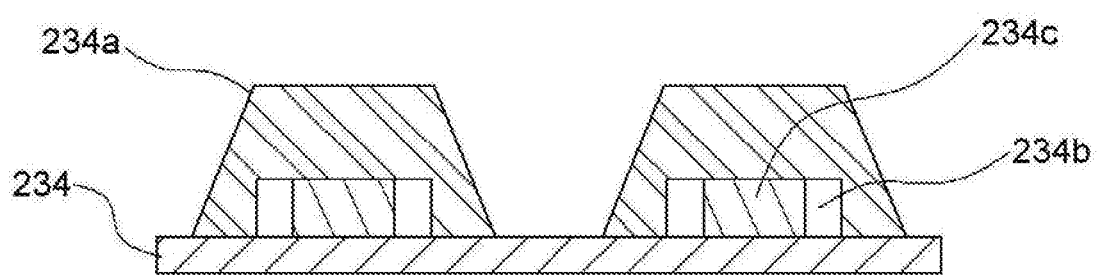
FIG. 10 is a sectional view showing the seating plate of the dust cleaning robot according to the present invention.

FIG. 1 is a perspective view showing a dust cleaning robot according to the present invention, FIG. 2 is a perspective view showing an operating state of a second stage part of the dust cleaning robot according to the present invention, FIG. 3 is a perspective view showing an operating state of the second stage part of a transfer robot unit of the dust cleaning robot according to the present invention, FIG. 4 is a plan view showing an operating state of the second stage part of the transfer robot unit of the dust cleaning robot according to the present invention, FIG. 5 is a plan view showing an operating state of support means of the transfer robot unit of the dust cleaning robot according to the present invention, FIG. 6 is a perspective view showing a first stage part of the transfer robot unit of the dust cleaning robot according to the present invention, FIG. 7 is a front view showing a climbing cleaning robot unit of the dust cleaning robot according to the present invention, FIG. 8 is a perspective view showing the coupled state between a coupling plate and a seating plate of the dust cleaning robot according to the present invention, FIG. 9 is a top view showing processes for fixing the dust cleaning robot according to the present invention to a dust collection plate, and FIG. 10 is a sectional view showing the seating plate of the dust cleaning robot according to the present invention.

As shown in FIGS. 1 to 10, a dust cleaning robot 10 according to the present invention largely includes a climbing cleaning robot unit 100 for climbing side surfaces of a dust collection plate to remove dust accumulated on the dust collection plate and a transfer robot unit 200 operating with the climbing cleaning robot unit 100 mounted thereon to transfer the climbing cleaning robot unit 100 to a direction of the side surfaces of the dust collection plate so that the climbing cleaning robot unit 100 is fixed to outer walls of the dust collection plate.

In more detail, the transfer robot unit 200 moves along the dust collection plate in forward and backward directions to allow the climbing cleaning robot unit 100 to be fixed to the outer walls of the dust collection plate.

Further, the transfer robot unit 200 includes a robot body 210, a first stage part 220, a second stage part 230, and support means 240.

Further, the robot body 210 includes a driving part for moving the transfer robot unit 200 to a direction of X-axis as a forward and backward direction.

The driving part includes a plurality of tracked wheels having rubber plates surrounded therearound and a driving motor for rotating the tracked wheels, and the driving part is located inside the robot body 210.

Further, the first stage part 220 is located on top of the robot body 210 and moves in the direction of X-axis.

Also, the second stage part 230 is located on top of the first stage part 220 and moves in a direction of Y-axis as a left and right direction.

The support means 240 is located between the first stage part 220 and the second stage part 230 in such a manner as to come into contact with one side surface of the dust collection plate to support the transfer robot unit 200 when the second stage part 230 moves to one side of the direction of Y-axis.

When the second stage part 230 moves to one side in the direction of Y-axis, that is, the climbing cleaning robot unit 100 is located on top of the second stage part 230, and the second stage part 230 moves to the outside of the robot body 210, so that the center of gravity of the transfer robot unit is inclined to one side of the direction of Y-axis.

As the second stage part 230 moves to one side in the direction of Y-axis, the transfer robot unit 200 is not stable, and accordingly, the support means 240 is provided to support the transfer robot unit 200 thereagainst.

On the other hand, the first stage part 220 includes a first guide 221, a first driver 222, and a first stage 223.

The first guide 221 includes first and second rails 221a and 221b disposed in the direction of X-axis on a top plate 211 of the robot body 210 and a pair of guide blocks 221c coupled correspondingly to the first and second rails 221a and 221b.

The first driver 222 includes a shaft 222a parallel-disposed between the first and second rails 221a and 221b and having a screw formed along the outer peripheral surface thereof, a moving block 222b engaged with the shaft 222a in such a manner as to move by the rotation of the shaft 222a, and a driving device 222c for rotating the shaft 222a.

The first stage 223 includes first and second long plates 223a and 223b coupled to tops of the guide blocks 221c, a first cross plate 223c located in the direction of Y-axis to allow the other side top of each of the first and second long plates 223a and 223b in the direction of X-axis to be coupled to the moving block 222b, and a second cross plate 223d located on one side of the direction of X-axis of each of the first and second long plates 223a and 223b in such a manner as to be located symmetrically to the first cross plate 223c.

The support means 240 includes a hydraulic piston 241 parallel-disposed between the first and second cross plates 223c and 223d in such a manner as to be extended to one side of the direction of Y-axis and a support part 242 disposed on the hydraulic piston 241 in such a manner as to come into contact with the side surfaces of the dust collection plate.

Further, the support part 242 includes a connection bracket 242a coupled to an end of a rod of the hydraulic piston 241 of the support means 240 and a pair of electromagnets 242b coupled to both sides of the connection bracket 242a.

In the state where the climbing cleaning robot unit 100 is mounted on the transfer robot unit 200, accordingly, when the second stage part 230 advances to the dust collection plate, the electromagnets 242b are activated and attached to given positions of the dust collection plate. After the climbing cleaning robot unit 100 moves down along the side surfaces of the dust collection plate and is thus seated on the transfer robot unit 200, next, the operations of the electromagnets 242b stop when the second stage part 230 is returned to the original position thereof.

The second stage part 230 includes a second stage 231, a rack shaft 232, a second driver 233, and a seating plate 234.

The second stage 231 includes rails 231a attached to the underside thereof in such a manner as to move along guide rails GR coupled to tops of the first and second cross plates 223c and 223d in the direction of Y-axis.

The rack shaft 232 is coupled to one side of the direction of X-axis of the second stage 231 in the direction of Y-axis and has a screw thread formed therearound.

The second driver 233 is rotated engagedly with the screw thread of the rack shaft 232 in such a manner as to move the second stage 231 to one side of the direction of Y-axis.

The seating plate 234 is coupled to top of the second stage 231 to seat the climbing cleaning robot unit 100 thereonto.

Further, the seating plate 234 has a plurality of seating blocks 234a protruding from top thereof to a shape of a cylinder having an inclined outer peripheral surface.

On the other hand, the climbing cleaning robot unit 100 includes a coupling plate 110 seated onto the seating plate 234, a robot body 120 located on top of the coupling plate 110, a brush part 130 located on an upper portion of the robot body 120, a fixing part 140 for fixing the climbing cleaning robot unit 100 to the dust collection plate, and an elevating part 150 for elevating the climbing cleaning robot unit 100 in the state where the climbing cleaning robot unit 100 is fixed to the dust collection plate by means of the fixing part 140.

At this time, the coupling plate 110 has coupling through holes 111 formed thereon to insert the seating blocks 234a thereinto, and the coupling through holes 111 have the same shapes as the seating blocks 234a.

As a gap is formed by the seating blocks 234a, further, even if the coupling through holes 111 and the seating blocks 234a are misaligned with each other at the time when the climbing cleaning robot unit 100 is seated onto the seating plate 234, the climbing cleaning robot unit 100 can be easily seated on the seating plate 234 by means of the movements of the seating blocks 234a.

Further, the coupling through holes 111 are larger by 1.2 to 1.5 times than the seating blocks 234a.

Further, the seating blocks 234a have gap recesses 234b formed at the inside thereof, and the gap recesses 234b have fixed protrusions 234c coupled to the seating plate 234.

Accordingly, gaps are formed between the seating blocks 234a and the fixed protrusions 234c, so that as the seating blocks 234a move, the climbing cleaning robot unit 100 can be easily seated on the transfer robot unit 200.

Further, the fixing part 140 includes clamp arms 141, hydraulic pistons 142, pivot shafts 143, pivot brackets 144, and rolling wheels 145.

The clamp arms 141 are provided in pair on the upper and lower portions of the robot body 120 and are bent to a given angle at their center.

The hydraulic pistons 142 are hinge-coupled to one side end of the corresponding pair of clamp arms 141.

The pivot shafts 143 are penetrated up and down into the bent portions of the clamp arms 141.

The pivot brackets 144 are attached to the robot body 120 to allow the clamp arms 141 to be pivotable around the pivot shafts 143.

The rolling wheels 145 are rotatingly brought into contact with the front and back surfaces of the dust collection plate.

As the clamp arms 141 are rotated on the front and back surfaces of the dust collection plate by means of the operations of the hydraulic pistons 142 of the fixing part 140, accordingly, the transfer robot unit 200 can be fixed to the dust collection plate.

The elevating part 150 includes rotary shafts 151 located in the middle portion of the robot body 110, a driver 152 located on one side of the robot body 110 to rotate the rotary shafts 151, and climbing wheels 153 coupled to each rotary shaft 151 in such a manner as to come into contact with the side surfaces of the dust collection plate to elevate the climbing cleaning robot unit 100.

Further, the brush part 130 includes first and second brushes (not shown) coming into contact with the front and back surfaces of the dust collection plate, brush shafts 132a and 132b having the first and second brushes mounted thereon and rotating around a center shaft thereof, a rotating plate 133 for coupling the brush shafts 132a and 132b thereto, and rotation drivers 134 coupled to both sides of the rotating plate 133 to rotate the rotating plate 133 to a direction of 90°.

Accordingly, the dust cleaning robot 10 is provided with the climbing cleaning robot unit 100 for climbing the side surface of the dust collection plate to remove the dust accumulated on the dust collection plate and the transfer robot unit 200 moving with the climbing cleaning robot unit 100 mounted thereon, so that the dust collection plate which is not directly cleaned by a worker can be cleaned, thereby improving cleaning efficiencies.

In the state where the transfer robot unit 200 is seated on the climbing cleaning robot unit 100, as mentioned above, the transfer robot unit 200 moves along the side surfaces of the dust collection plates spaced apart from each other by a given distance on the opposite sides thereto.

Further, the transfer robot unit 200 operates the first and second stage parts 220 and 230 and the support means 240 to allow the climbing cleaning robot unit 100 to be fixed to the outer walls of the dust collection plate.

In more detail, the hydraulic piston 241 of the support means 240 operates, and the second stage 231 moves forwardly to the dust collection plate, so that the climbing cleaning robot unit 100 seated onto the seating plate 234 moves to the dust collection plate.

Further, the electromagnets 242*b* operate so that they are attached to given positions of the dust collection plate to allow the transfer robot unit 200 to be supported stably.

After the second stage 231 moves forwardly to allow the climbing wheels 153 to come into contact with the side surface of the dust collection plate, the clamp arms 141 of the climbing cleaning robot unit 100 are rotated to the front and back surfaces of the dust collection plate to allow the climbing cleaning robot unit to be fixed to the dust collection plate.

If the driver 152 of the elevating part 150 operates, further, the climbing cleaning robot unit 100 is elevated along the side surfaces of the dust collection plate by means of the rotations of the climbing wheels 153.

If the climbing cleaning robot unit 100 is fixed to the dust collection plate, also, cleaning starts by the operation of the brush part 130.

Also, the climbing cleaning robot unit 100 is separated from the seating plate 234 of the climbing cleaning robot unit 100.

After finishing the cleaning, the climbing cleaning robot unit 100 is seated on the seating plate 234 again.

As gaps are formed by the seating blocks 234*a*, further, even if the coupling through holes 111 and the seating blocks 234*a* are misaligned with each other at the time when the climbing cleaning robot unit 100 is seated onto the seating plate 234, the climbing cleaning robot unit 100 can be easily seated on the seating plate 234 by means of the movements of the seating blocks 234*a*.

If the seating of the climbing cleaning robot unit 100 on the seating plate 234 is finished, the second stage 231 is returned to its original position.

After the operations of the electromagnets 242*b* stop, further, the hydraulic piston 241 of the support means 240 operates to return the support part 242 to its original position.

Further, the transfer robot unit 200 on which the climbing cleaning robot unit 100 is mounted operates to move to next dust collection plate and cleans the corresponding dust collection plate.

As described above, the dust cleaning robot according to the present invention is provided with the climbing cleaning robot unit for climbing side surfaces of the dust collection plate not directly cleaned by a worker so as to clean the dust collection plate and the transfer robot unit operating with the climbing cleaning robot unit mounted thereon to transfer the climbing cleaning robot unit, so that the dust collection plate is perfectly cleaned to improve cleaning efficiencies.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A dust cleaning robot (10) for cleaning dust collection plates spaced apart from each other by a given distance on an opposite side thereto, the dust cleaning robot (10) comprising:
    a climbing cleaning robot unit (100) for climbing side surfaces of each dust collection plate to remove dust accumulated on the dust collection plate; and
    a transfer robot unit (200) operating with the climbing cleaning robot unit (100) mounted thereon to transfer the climbing cleaning robot unit (100) to the side surfaces of the dust collection plate so that the climbing cleaning robot unit (100) is fixed to outer walls of the dust collection plate,
    wherein the transfer robot unit (200) comprises:
    a robot body (210) having a driving part which moves the transfer robot unit (200) to a direction of X-axis as a forward and backward direction;
    a first stage part (220) movably mounted on top of the robot body (210) and having a first driver which moves the first stage to the direction of X-axis;
    a second stage part (230) movably mounted on top of the first stage part (220) and having a second driver which moves the second stage part to a direction of Y-axis as a left and right direction; and
    support means (240) located between the first stage part (220) and the second stage part (230) in such a manner as to come into contact with one side surface of the dust collection plate to support the transfer robot unit (200) when the second stage part (230) moves to one side of the direction of Y-axis.

2. The dust cleaning robot according to claim 1, wherein the first stage part (220) comprises:
    a first guide (221) having a pair of guide blocks (221*c*) coupled correspondingly to first and second rails (221*a* and 221*b*) disposed in the direction of X-axis on a top plate (211) of the robot body (210);
    the first driver (222) having a shaft (222*a*) parallel-disposed between the first and second rails (221*a* and 221*b*) and a screw formed along the outer peripheral surface thereof, a moving block (222*b*) engaged with the shaft (222*a*) in such a manner as to move by the rotation of the shaft (222*a*), and a driving device (222*c*) for rotating the shaft (222*a*); and
    a first stage (223) having first and second long plates (223*a* and 223*b*) coupled to tops of the guide blocks (221*c*), a first cross plate (223*c*) located in the direction of Y-axis to allow the other side top of each of the first and second long plates (223*a* and 223*b*) in the direction of X-axis to be coupled to the moving block (222*b*), and a second cross plate (223*d*) located on one side of the direction of X-axis of each of the first and second long plates (223*a* and 223*b*) in such a manner as to be located symmetrically to the first cross plate (223*c*).

3. The dust cleaning robot according to claim 2, wherein the support means (240) comprises:
    a hydraulic piston (241) parallel-disposed between the first and second cross plates (223*c* and 223*d*) in such a manner as to be extended to one side of the direction of Y-axis; and
    a support part (242) disposed on the hydraulic piston (241) in such a manner as to come into contact with the side surfaces of the dust collection plate.

4. The dust cleaning robot according to claim 3, wherein the second stage part (230) comprises:
    a second stage (231) having rails (231*a*) attached to the underside thereof in such a manner as to move along guide rails (GR) coupled to tops of the first and second cross plates (223*c* and 223*d*) in the direction of Y-axis;
    a rack shaft (232) coupled to one side of the direction of X-axis of the second stage (231) in the direction of Y-axis and having a screw thread formed therearound;

the second driver (233) rotated engagedly with the screw thread of the rack shaft (232) in such a manner as to move the second stage (231) to one side of the direction of Y-axis; and a seating plate (234) coupled to top of the second stage (231) to seat the climbing cleaning robot unit (100) thereonto.

5. The dust cleaning robot according to claim 4, wherein the climbing cleaning robot unit (100) comprises:

a coupling plate (110) seated onto the seating plate (234);

a robot body (120) located on top of the coupling plate (110);

a brush part (130) located on an upper portion of the robot body (120);

a fixing part (140) for fixing the climbing cleaning robot unit (100) to the dust collection plate; and an elevating part (150) for elevating the climbing cleaning robot unit (100) in the state where the climbing cleaning robot unit (100) is fixed to the dust collection plate by means of the fixing part (140).

6. The dust cleaning robot according to claim 5, wherein the seating plate (234) has a plurality of seating blocks (234*a*) protruding from top thereof to a shape of a cylinder having an inclined outer peripheral surface, and the coupling plate (110) has coupling through holes (111) formed thereon to insert the seating blocks (234*a*) thereinto, so that as a gap is formed by the seating blocks (234*a*), the climbing cleaning robot unit (100) is seated on the seating plate (234) by means of the movements of the seating blocks (234*a*) even if the coupling through holes (111) and the seating blocks (234*a*) are misaligned with each other at the time when the climbing cleaning robot unit (100) is seated onto the seating plate (234).

\* \* \* \* \*